United States Patent [19]

Manz

[11] 4,206,662
[45] Jun. 10, 1980

[54] LOCKING DIFFERENTIAL FOR A FOUR-WHEEL DRIVE SYSTEM HAVING A COAST-RELEASE MECHANISM

[75] Inventor: David F. Manz, Bloomfield Hills, Mich.

[73] Assignee: General Motors Corporation, Detroit, Mich.

[21] Appl. No.: 907,111

[22] Filed: May 18, 1978

[51] Int. Cl.$^2$ .............................................. F16H 1/44
[52] U.S. Cl. .................................... 74/710.5; 74/711
[58] Field of Search ................. 74/710.5, 711; 192/35

[56] References Cited

U.S. PATENT DOCUMENTS

| | | | |
|---|---|---|---|
| 3,818,781 | 6/1974 | Goscenski | 74/711 |
| 3,886,813 | 6/1975 | Baremor | 74/710.5 |
| 3,915,032 | 10/1975 | Ottemann | 74/711 |

*Primary Examiner*—C. J. Husar
*Assistant Examiner*—Frank Mc Kenzie
*Attorney, Agent, or Firm*—Donald F. Scherer

[57] ABSTRACT

A locking differential having a speed-sensitive actuator for initiating clutch engagement to provide differential lock-up. A latching bracket member for the actuator is responsive to the direction of torque transmission to ensure that the differential is in an unlocked condition during vehicle coasting.

2 Claims, 3 Drawing Figures

LOCKING DIFFERENTIAL FOR A FOUR-WHEEL DRIVE SYSTEM HAVING A COAST-RELEASE MECHANISM

This invention relates to locking differentials and more particularly to locking differentials having a torque direction responsive latching member.

Prior art devices, such as Ottemann, U.S. Pat. No. 3,606,803 issued Sept. 21, 1971, disclose the use of a centrifugal actuator and latching member to initiate lock-up of the differential during a slip condition between the differential input and the side gear outputs. The clutch assembly for lock-up is, in the prior art, engaged by a cam driven by one of the side gears, as shown in U.S. Pat. No. 3,985,045 to Shilling et al, issued Oct. 12, 1976, and U.S. Pat. No. 3,845,672 to Goscenski, Jr., issued Nov. 5, 1974. These prior art devices are generally utilized in conventional rear wheel differentials wherein it is desired to limit the slip differential between the output axles of a conventional rear wheel drive vehicle. Similar differential assemblies are utilized to limit the slip between the front and rear wheels of the four-wheel drive vehicle, such as that shown in U.S. Pat. No. 3,886,813 to Baremore, issued June 3, 1975. The Baremore patent also teaches the use of a release mechanism for the clutch upon torque reversal within the system. The releasing of the differential in the Baremore patent is accomplished by permitting the cam to have sufficient relative movement to overrun at maximum torque transmission to unlock the clutch when high torque loads are encountered. This, of course, requires that during a torque reversal, from drive to coast, the differential must transmit the maximum torque before release of the lock-up is encountered.

The present invention incorporates a bracket which initiates clutch engagement during a slipping condition and also causes the bracket to assume a disengaging position during torque reversal, such that clutch release is accomplished without further increase in the torque transmission through the differential itself.

It is therefore an object of this invention to provide an improved locking differential having a latching bracket responsive to the direction of torque transmission.

It is another object of this invention to provide an improved locking differential wherein the latching bracket and the differential carrier are rotatable with the input shaft and wherein a lost motion mechanism permits relative movement between the latching bracket and the differential carrier during a torque reversal so that the lock actuating mechanism mounted on the differential carrier, which is triggered by the latching bracket, is inoperative.

These and other objects and advantages of the present invention will be more apparent from the following description and drawings in which.

Figures 1, 2, 3:
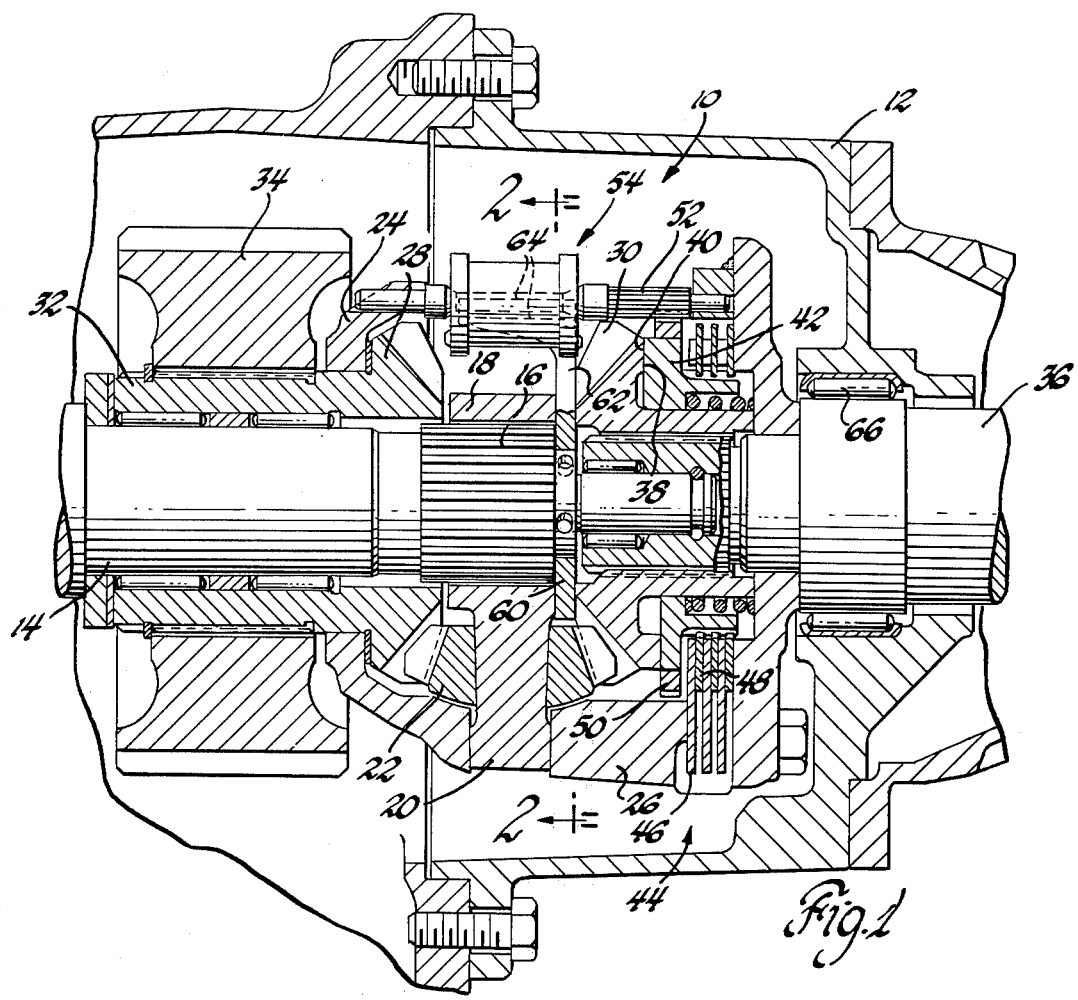
FIG. 1 is a sectional elevational view of a locking differential.
FIG. 2 is an end view of the latching bracket and centrifugal actuator.
FIG. 3 is a view of the latching bracket.

Referring to the drawings, wherein the same characters represent the same or corresponding parts throughout the several views, there is seen a differential assembly 10 rotatably supported in a differential housing 12. The differential 10 has an input shaft 14 which is splined at 16 to a differential carrier 18 having a pair of spokes 20 on which are rotatably mounted pinion gears 22. The differential also includes a housing 24 which is secured to the carrier 18 and a clutch and end cover housing 26 which is also secured to the member 18. The differential 10 further includes a pair of side gears 28 and 30 which mesh with the pinion gears 22. The side gear 28 has integral therewith an output member 32 upon which is splined an output gear 34. A side gear 30 is splined to an output shaft 36.

The side gear 30 also has formed thereon a cam surface 38 which cooperates with a complementary cam surface 40 formed on a clutch engagement member 42. The clutch engagement member 42 is a component in a clutch assembly, generally designated 44, which also includes a plurality of interleaved clutch plates 46 and 48. The clutch plates 46 are drivingly connected to the housing 26 to rotate with the carrier 18 and the clutch plates 48 are drivingly connected to the clutch engagement member 42 to normally rotate with the side gear 30. The clutch engagement member 42 also has formed thereon a gear member 50 which meshes with a geared shaft 52, which is a component in a centrifugal actuator assembly, generally designated 54. The centrifugal actuator assembly 54 may be constructed in accordance with the centrifugal actuator assembly shown in U.S. Pat. No. 3,606,803, and includes centrifugal weights 56 and 58. The clutch and cam mechanism may be constructed in accordance with the clutches shown in U.S. Pat. Nos. 3,985,045 or 3,845,672. The aforementioned patents may be referred to for a more complete description of the structure and operation of the clutch and centrifugal actuator assembly. However, it is believed those skilled in the art will be quite familiar with the operation of such devices.

The centrifugal actuator assembly 54 is rotated in unison with the carrier 18 of the differential 10. However, the geared shaft 52 provides a speed input which is proportional to the speed of the clutch engagement member 42. As long as the clutch engagement member 42 and carrier 18 are rotating in unison, there is no speed differential apparent. However, during a speed differential between the side gears 28 (output 32) and 30 (output 36) when compared to the carrier 18, the shaft 52 will be rotated on its axis relative to the centrifugal actuator assembly 54 resulting in extension of one or the other of the centrifugal weights 56 and 58, shown in FIG. 2.

The input shaft 14 has secured thereto a latching bracket 60 which has a radially extending arm 62 on which is formed latching or stop surfaces 64. The purpose of these surfaces 64 is to engage the centrifugal weights 56 or 58 as they extend at a predetermined speed differential to prevent further speed differential and cause the clutch engagement member 42 of clutch assembly 44 to rotate in unison with the carrier 18 such that the camming action between surfaces 38 and 40 will induce separation therebetween to engage the clutch assembly 44 to prevent further speed differential between the side gear 30 and the carrier 18 thereby locking the differential for unitary rotation.

The splined connection 16 between input shaft 14 and carrier 18 is designed such that there is a radial clearance, as seen in FIG. 2, between the input shaft 14 and carrier 18 such that a small amount of relative angular movement will occur between these members depending upon whether torque is being input from the shaft 14 to the carrier 18 or whether the torque is being transmitted from the carrier 18 to the shaft 14. This radial clearance does not affect the axial alignment of these components since the housing 24 is rotatably supported on the side gear 28 which in turn is rotatably supported on input shaft 18. Input shaft 18 is, of course, rotatably supported in the differential housing 12 on bearings, not shown, similar to and axially aligned with needle bearing 66 which rotatably supports output shaft 36 in the differential housing 12. The clutch and end cover housing 26 is rotatably supported on the output shaft 36. During normal driving operation, the input shaft 14 will transmit torque to the carrier 18 and thence to the output member 32 and shaft 36. During vehicle coasting, the output member 32 and shaft 36 will transmit torque through side gears 28 and 30, respectively, to the carrier 18 and through carrier 18 to the input shaft 14.

During normal driving conditions, that is, shaft 14 is transmitting torque to carrier 18, the latching bracket 60 will be in a position shown in FIG. 2, such that the centrifugal weights 56 or 58 upon extension can engage the surfaces 64. However, when the vehicle is in a coast condition, the latching bracket 60 will be rotated slightly clockwise, as viewed in FIG. 2, relative to the carrier 18, due to the lost motion permitted by the spline connection 16, such that the surfaces 64 will be sufficiently spaced from the centrifugal weights 56 and 58 such that engagement cannot occur upon extension thereof. Should the torque reversal occur while one of the centrifugal weights 56 or 58 is engaged with latching bracket 60, the relative motion of the bracket 60 will disengage the centrifugal weight from latching bracket 60 such that the clutch engagement member 42 will be permitted to rotate relative to the carrier 18 and the cam forces will be reduced to essentially zero such that the clutch will be disengaged and the clutch assembly 44 of the differential will be released thus permitting relative rotation between the output member 32 and shaft 36 as occurs during normal differential action.

The output member 32 is preferably connected to the forward or front wheels of a four-wheel drive vehicle while the output shaft 36 is connected to the rear wheels of a vehicle. Either of these members may be connected to another differential which will permit differential speeds between the right and left wheels of the vehicle. These types of systems are well-known.

The radially undercut spline 16 has been selected as a preferred method of incorporating limited lost motion between the input shaft 14 and the carrier 18. However, those skilled in the art will be familiar with a number of ways of providing such lost motion, including the removal of every other tooth on the splines which will provide more significant relative rotational differences or the use of a drive slot and pin arrangement disposed between the carrier 18 and the shaft 14 wherein the bracket 60 may be formed directly with the drive pin such that the relative motion between the members 14 and 18 can be accomplished.

From the foregoing description, it will be apparent that the differential mechanism described will provide for limited slip between the fore and aft wheels of a four-wheel drive during a conventional driving arrangement. It should also be evident that when the differential is in a lock condition and the operator releases the throttle such that a coast condition occurs, the locking differential will be released to provide a conventional differential system wherein some speed differential is necessary between the fore and aft wheels of the vehicle during normal driving to accommodate the various design parameters such as torque distribution and rolling radius of the tires.

While the latching bracket 60 is shown as being secured to the input shaft 14 by a pair of threaded fasteners, it should be apparent that many other attaching means could be used, such as a drive slot and key or a spline mechanism.

Obviously, many modifications and variations are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An improvement in locking differentials wherein a friction clutch drivingly connects one side gear of the differential to the carrier thereof when a predetermined speed differential is present between the side gear and the carrier, a shaft drivingly connects the carrier and normally transmits torque thereto and a speed differential sensitive control having radially movable centrifugally actuated members engageable with a bracket to initiate engagement of the friction clutch, the improvement comprising; lost motion means between the shaft and the carrier for permitting small relative angular movement therebetween when torque is transmitted from the carrier to the shaft, said bracket being drivingly connected to said shaft to be moved angularly out of engaging relation with said radially movable centrifugally actuated members when torque is transmitted from the carrier to the shaft to prevent initiation of clutch engagement if the clutch is not engaged and to initiate disengagement of the clutch if the clutch is engaged.

2. An improvement in locking differentials wherein a friction clutch drivingly connects one side gear of the differential to the carrier thereof when a predetermined speed differential is present between the side gear and the carrier, a shaft drivingly connects the carrier and normally transmits torque thereto and a speed differential sensitive control having radially movable centrifugally actuated members engageable with a locking bracket and rotatable with the carrier to initiate engagement of the friction clutch, the improvement comprising; drive splines formed on the shaft and the carrier with a radial clearance therebetween for permitting small relative angular movement therebetween when a torque reversal between the carrier and the shaft occurs, said locking bracket being drivingly connected to said shaft to be moved angularly out of engaging relation with said radially movable centrifugally actuated members when torque is transmitted from the carrier to the shaft to prevent initiation of clutch engagement if the clutch is not engaged and to initiate disengagement of the clutch if the clutch is engaged.

* * * * *